(12) United States Patent
Staines

(10) Patent No.: US 6,935,669 B2
(45) Date of Patent: Aug. 30, 2005

(54) RETROFITTABLE STORAGE CONTAINER ADAPTED FOR PLACEMENT UNDER THE HOOD OF A MOTORIZED VEHICLE

(76) Inventor: Jay Staines, 147 Hawthorne Ave., Palo Alto, CA (US) 94301

( * ) Notice: Subject to any disclaimer, the term of this patent is extended or adjusted under 35 U.S.C. 154(b) by 0 days.

(21) Appl. No.: 10/702,097

(22) Filed: Nov. 4, 2003

(65) Prior Publication Data
US 2005/0093322 A1 May 5, 2005

(51) Int. Cl.[7] ................................................ B60R 11/06
(52) U.S. Cl. .................................... 296/37.1; 296/37.6
(58) Field of Search ............................. 296/37.1, 37.6, 296/193.09, 106; 293/106, 117; 224/513–516, 488, 492, 495, 517, 518, 544, 556

(56) References Cited

U.S. PATENT DOCUMENTS

| | | | | |
|---|---|---|---|---|
| 1,733,347 A | * | 10/1929 | Holmes ....................... | 224/513 |
| 4,136,904 A | * | 1/1979 | Lauderdale ................. | 296/37.1 |
| 4,179,153 A | * | 12/1979 | Cole, Jr. ..................... | 296/37.1 |
| 4,660,880 A | * | 4/1987 | Bensch ....................... | 296/37.1 |
| 5,135,274 A | * | 8/1992 | Dodd .......................... | 293/117 |
| 5,358,304 A | * | 10/1994 | Kanemitsu et al. ..... | 296/193.09 |
| 5,460,420 A | * | 10/1995 | Perkins et al. .............. | 293/106 |
| 5,687,895 A | * | 11/1997 | Allison et al. .............. | 224/542 |
| 5,823,585 A | * | 10/1998 | Tanguay ...................... | 293/106 |
| 6,347,823 B1 | * | 2/2002 | Ozawa et al. ........... | 296/193.09 |
| 6,425,510 B1 | * | 7/2002 | King ........................... | 224/401 |
| 6,672,652 B2 | * | 1/2004 | Takeuchi et al. ........ | 296/193.09 |
| 6,708,856 B1 | * | 3/2004 | Yamamoto ................... | 224/488 |

* cited by examiner

Primary Examiner—D. Glenn Dayoan
Assistant Examiner—Greg Blankenship
(74) Attorney, Agent, or Firm—Pillsbury Winthrop Shaw Pittman LLP

(57) ABSTRACT

The present invention provides a method of providing a container apparatus adapted for placement in the engine compartment of a plurality of trucks types, and a container apparatus. In a particular embodiment, the container includes an exterior surface covering an inner cavity. A first support or plurality of first supports protrude from the exterior surface of the container. The first support or plurality of first supports each further include a first attachment mechanism, with each first attachment mechanism adapted to attach to a mounting bar disposed between a radiator and a front bumper of the truck type. A second support or second plurality of second supports each protrude from the exterior surface of the container and include a second attachment mechanism, with each second attachment mechanism adapted to attach to a back portion of the front bumper.

39 Claims, 4 Drawing Sheets

RETROFITTABLE STORAGE CONTAINER ADAPTED FOR PLACEMENT UNDER THE HOOD OF A MOTORIZED VEHICLE

FIELD OF THE ART

The present invention relates to a retrofittable storage container adapted for placement under the hood of a motorized vehicle.

BACKGROUND OF THE RELATED ART

Storage containers for motorized vehicles are well known, including storage compartments built into the interior, such as the glove compartment, as well as on the exterior, such as trunks in sedans, and large storage boxes that are adaptable to fit into a part of the bed of a pick-up truck.

U.S. Pat. No. 4,660,880 describes a rigid container adapted for mounting within the engine compartment of an automobile, which made of a rigid material mounted over a fender well, and which occupies unused space under the hood of a car. The rigid container of the '890 patent, however, is particularly adapted for mounting over a fender well, and as such has a peculiar shape, and specific design that allows for mounting in that location. Such a mounting location does not exist in other vehicle types, thereby preventing the container described in the '880 patent from being used in such other vehicle types. Furthermore, the pair of mounting brackets described in the '880 patent are designed to work in conjunction with a base that rests over the fender well. thereby providing for further stability of the container within the engine compartment. For vehicles that do not have this area available for placement of the storage container, it will simply not work in them.

Accordingly, there is the need for a storage container for placement in the engine compartment that will work on other vehicle types, particularly trucks.

SUMMARY OF THE INVENTION

The present invention provides a method of providing a container apparatus adapted for placement in the engine compartment of a plurality of trucks types, and a container apparatus.

In a particular embodiment, the container includes an exterior surface covering an inner cavity. A first support or first plurality of first supports each protrude from the exterior surface of the container. The first supports or plurality of first supports each further include a first attachment mechanism, with each first attachment mechanism disposed above the container and adapted to attach to a mounting bar disposed between a radiator and a front bumper of the truck type. A second support or plurality of second supports each protrude from the exterior surface of the container and include a second attachment mechanism, with each second attachment mechanism adapted to attach to a back portion of the front bumper.

The method of inserting the container into the engine compartment includes attaching each of the first and second attachment mechanisms to the mounting bar and back portion of the front bumper, respectively, thereby providing the container in a substantially level orientation, such that a bottom of the inner cavity is substantially parallel to a plane created by the two front and two rear tires.

BRIEF DESCRIPTION OF THE DRAWINGS

The present invention is illustrated by way of example, and not limitation, in the figures of the accompanying drawings in which like references denote similar elements, and in which.

DETAILED DESCRIPTION OF THE PREFERRED EMBODIMENTS

Figure 1:
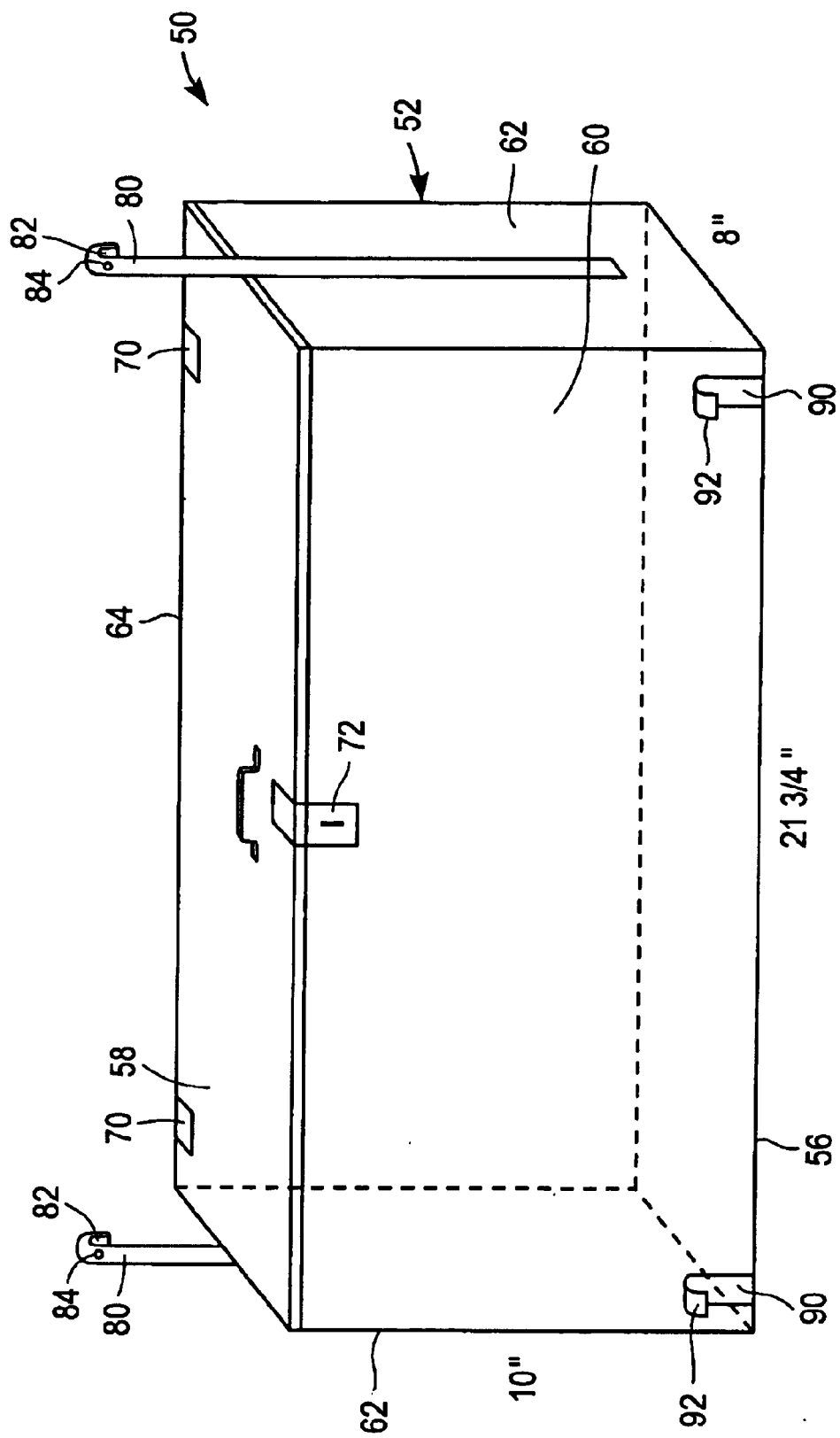
FIG. 1 illustrates a front perspective view of the storage container apparatus according to the present invention.
Figure 2:
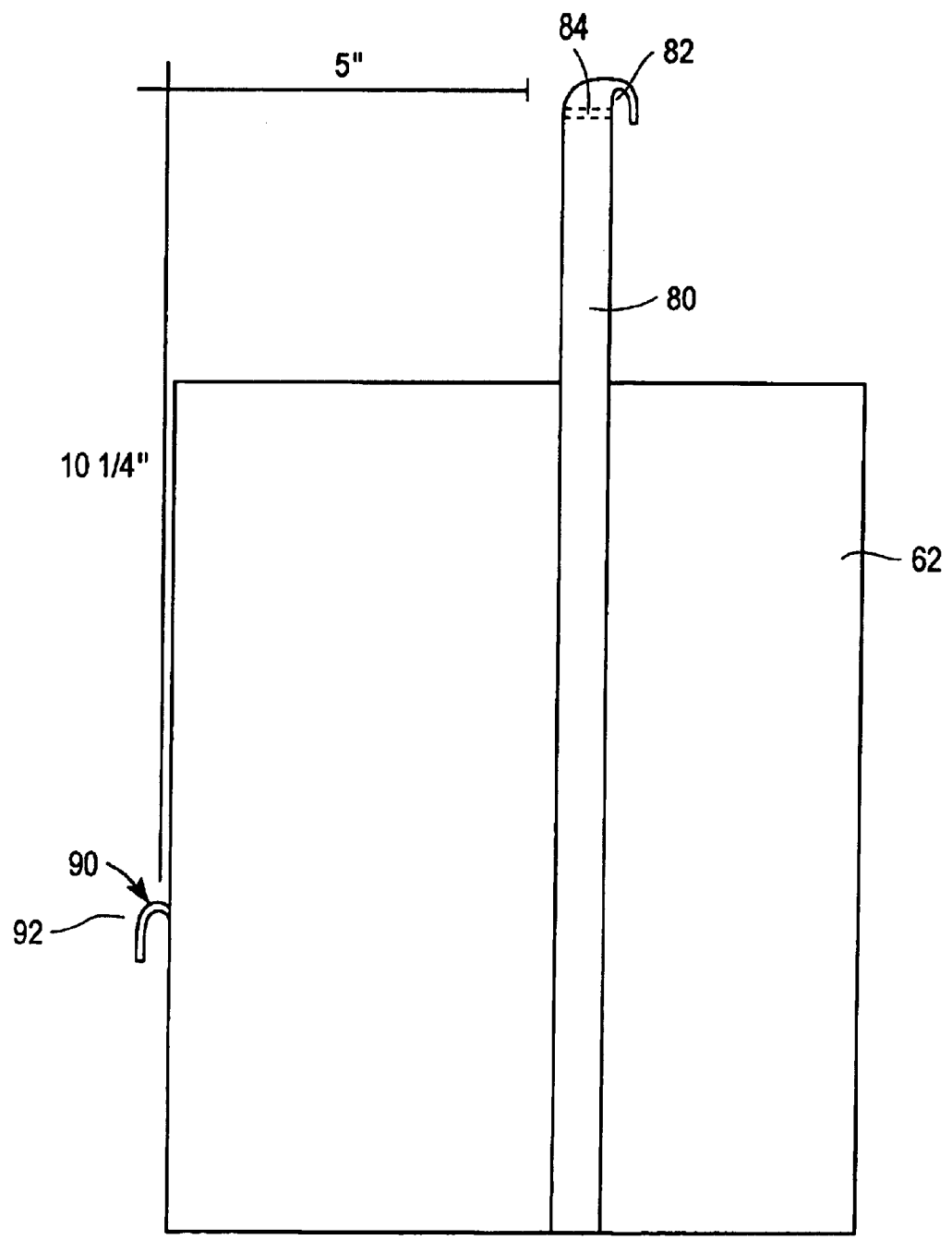
FIG. 2 illustrates a side view of the storage container apparatus according to the present invention.

FIG. 1 illustrates a front perspective view of the storage container apparatus 50 according to the present invention, whereas FIG. 2 illustrates a side view. The storage container apparatus is adapted for insertion under the hood of a motorized vehicle, and in particular a truck. More particularly, the invention is suited for Dodge RAM pickup trucks manufactured since 2002, which operate using unleaded fuels. The container apparatus 50 can be used for storing a variety of articles therein, such as jumper cables, tools, first aid kit, flashlight, and the like.

The storage container apparatus 50 includes a container 52, which has therein an inner cavity 52A adapted for storing articles therein, as shown in FIG. 2. The inner cavity 52A is formed by the inner walls of the exterior surface of the container 52. The exterior surface includes a bottom 56, an optional top lid 58, a front wall 60, width sides 62, and a back wall 64, and the inner surface of these features thereby defines the inner cavity 52A. The exterior surface can be made from a variety of materials, including plastic, wood, or metal.

While the internal dimensions of the inner cavity 52A are not significant, the outer dimensions of the exterior surface is, to the extent that the following dimensions permit a single storage container 52 to be used in a variety of different vehicle types. In particular, dimensions of a maximum outer width dimension of 8 inches, and outer dimensions of about 22 inches length and 10 inches height have been determined to provide this functionality.

The top lid 58 is optional (if not used, an open area exists). If used, it can simply insert onto the top of the container 52, or, alternatively as shown, use hinges 70 and a closing mechanism 72. The closing mechanism 72 can be a simple latch, or a lock, which can be of a key or a combination type. If of a key type, the key used can be the same as, or different from, the ignition key.

Also illustrated in FIG. 1 are a first plurality of supports 80 each protruding from an exterior surface of the container 52. The supports 80 can be made from the same material as the exterior surface (particularly if moldable parts are used in fabrication), or a different material, and then permanently attached to the container 52. In the preferred embodiment shown, each support 80 protrudes upwardly, extending above the container 52, from one of the width sides 62. The first plurality of supports 80 each further include a first attachment mechanism 82. The first attachment mechanisms 82 are disposed in a parallel plane with each other, thereby being adapted to attach to a mounting bar 108 on the vehicle, as described further hereinafter with reference to FIG. 3, and thus adapted to maintain the container 52 in a substantially level orientation, such that the bottom of the inner cavity 52A is substantially parallel to a plane created by the two front and two rear tires of the vehicle. The preferred attachment mechanism 82 illustrated in FIG. 1 is a U-shaped clip adapted to fit over a portion of the mounting bar 108, although other attachment mechanism can also be used, including a welded connection if the supports 80 can be welded, or some other type of attachment mechanism, such as a screw, bolt or rivet.

Figure 3:
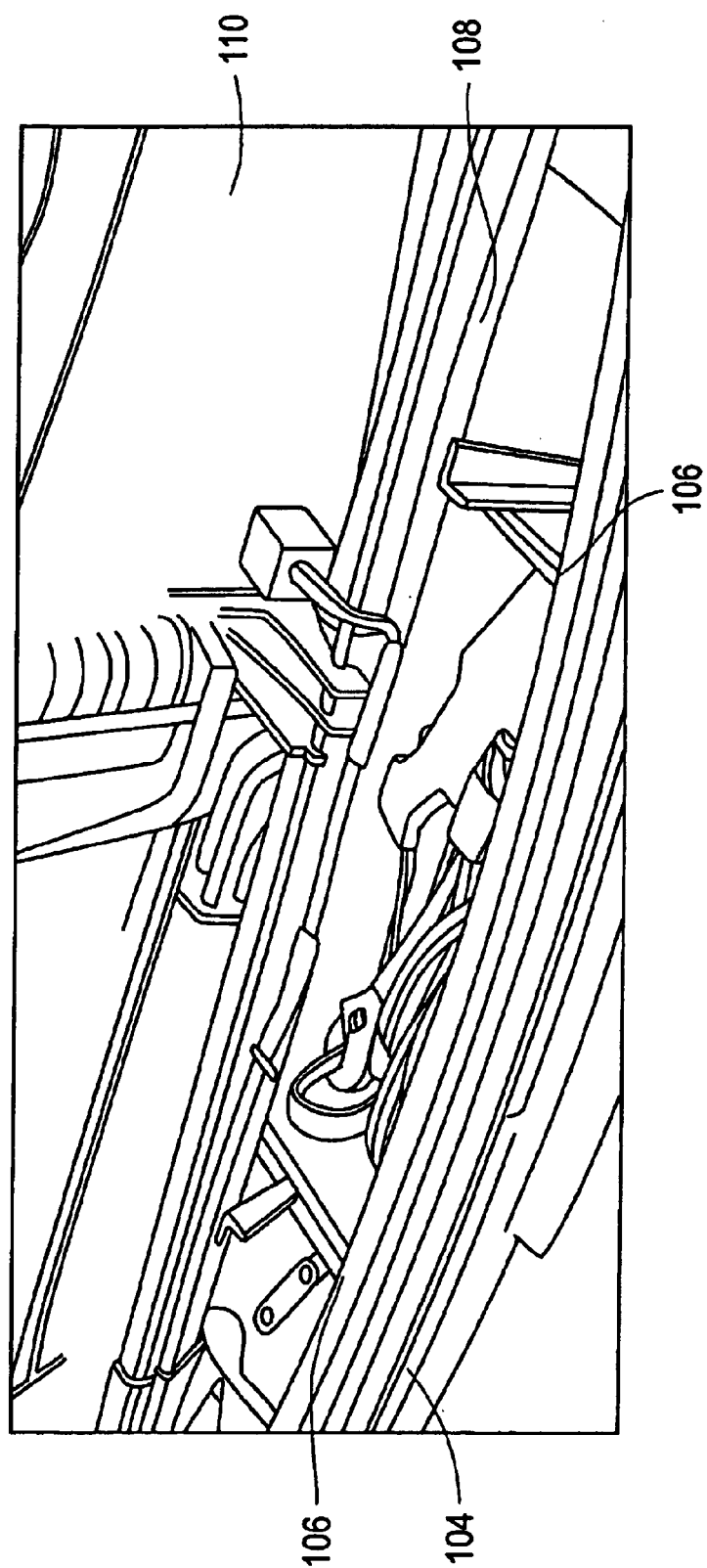
FIG. 3 illustrates the storage container apparatus according to the present invention disposed within the engine compartment.

In addition to the attachment mechanism 82, there can also be included a fastener 84, the fastener 84 preferably adapted for insertion into a hole (not shown) on the mounting bar 108 of FIG. 3. This fastener can provide greater stability to the container, but is optional, although it is to be noted that the U-shaped clip is optional, if the attachment mechanism becomes of a more permanent type, such as the screw, bolt or rivet mentioned above.

Figure 4:
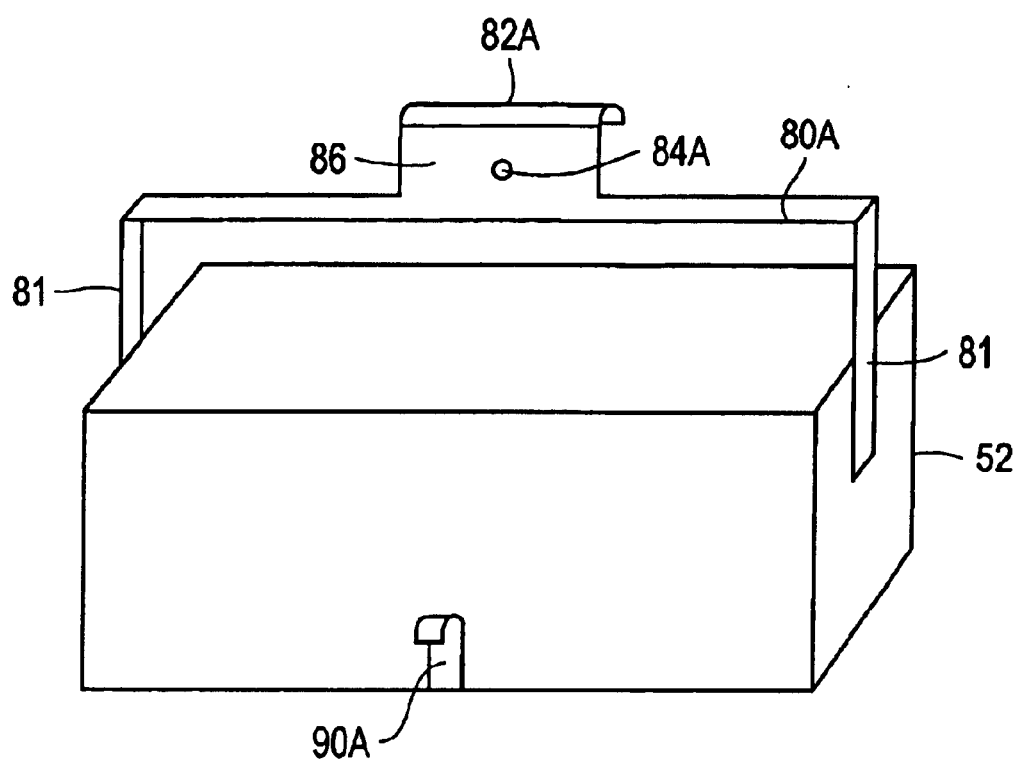
FIG. 4 illustrates another embodiment of the storage container apparatus according to the present invention.

It is also noted that the first supports 80 could instead be a single support 80A, which has two arms 8A which protrude from the container 52, and meet in a central section 86, or some other configuration. Other portions of the single support 80A are similar to those described previously, and labeled as attachment mechanism 82A and fastener 84A, as shown in FIG. 4.

Further illustrated in FIG. 1 are a second plurality of supports 90, each protruding from the exterior of the container 52, preferably the front wall exterior surface 60. The supports 90 can be made from the same material as the exterior surface (particularly if moldable parts are used in fabrication), or a different material, and then permanently attached to the container 52. The supports 90 each further included a second attachment mechanism 92, which are disposed in a parallel plane with each other, and adapted to attach to a back portion 106 of the front bumper 104, thereby providing further stability to the container, as described further hereinafter with reference to FIG. 3. The supports 90 include as the second attachment mechanism downwardly extending clips 92, such that the back portion of the front bumper becomes disposed between the clip 92 and the front wall exterior surface 60 of the container 52. Preferably, the back portion of the front bumper is disposed between the clip 92 and the front wall exterior surface 60 in such a manner that the second attachment mechanism is not rigidly attached to the back portion 106, thereby permitting minimal movement of the container 52 independent of the front bumper 104.

It is also noted that the second supports 90 could instead be a single support 90A, which is formed like one of the second supports 90. Preferably, however, the location of the single second support 90A is in the center of the front wall exterior surface 60, as shown in FIG. 4.

FIG. 2 illustrates the side view of the storage container apparatus according to the present invention, as noted above. This view does not illustrate the top lid 58. In addition to the descriptions provided above, it is apparent that a vertical distance between each of the first supports 80 and each of the second supports 90 is about 10¼ inches, and a horizontal distance of about 5" between each of the first supports 80 and each of the second supports 90 is about 5."
These dimensions allow for installation of the container apparatus 50 into a variety of vehicle types, as described above.

FIG. 3 illustrates placement of the container apparatus 50 into the vehicle. As shown, the vehicle contains an engine compartment 100 that is covered by a top hood (not shown), and a front bumper 104 having a back bumper portion 106 adapted for insertion of the attachment mechanisms 92 associated with supports 90. Also illustrated is a front support bar 108 disposed between a radiator 110 and the front bumper 104.

When inserting the container apparatus 50 into the engine compartment 100, the attachment mechanism 92 and the attachment mechanisms 84 can almost simultaneously be placed, such that the container apparatus 50 then is held in place based upon four different support locations: two supports 80 and two supports 90.

Although the present invention has been described with reference to specific exemplary embodiments, it will be evident to one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

I claim:

1. A method of providing a container for storing an object to one of a plurality of different truck types having two front wheels, two rear wheels and an engine compartment, the engine compartment in each of the plurality different vehicle types including a top hood, a front bumper disposed below the front hood, and a mounting bar disposed between a radiator and the front bumper, wherein the front bumper, the mounting bar, and the radiator are disposed in a same position relative to each other for each of the plurality of different truck types, the method comprising the steps of:
   selecting the container, the container further including an exterior surface covering an inner cavity, and wherein a first support protrudes from the exterior surface of the container, the first support further including a first attachment mechanism, the first attachment mechanism disposed above the container and adapted to attach to the mounting bar, and wherein a second support protrudes from the exterior surface of the container, the second support further including a second attachment mechanism; and
   inserting the container into the engine compartment of any one vehicle from the plurality of different truck types, the step of inserting including a first step of attaching the first attachment mechanism to the mounting bar, and a second step of attaching the second attachment mechanism to a back portion of the front bumper, wherein the first and second steps of attaching provide the container in a substantially level orientation, such that a bottom of the inner cavity is substantially parallel to a plane created by the two front and two rear tires.

2. The method according to claim 1 wherein the step of selecting further provides:
   a first plurality of first supports that each protrude from the exterior surface of the container, the first plurality of first supports each further including a first attachment mechanism, the first attachment mechanism for each of the first plurality of first supports disposed above the container, adapted to attach to the mounting bar, and disposed in a parallel plane with each other; and
   a second plurality of second supports each protruding from the exterior surface of the container, the second plurality of second supports each further including a second attachment mechanism; and
wherein the first and second steps of attaching attach the first plurality of first supports and the second plurality of supports to the mounting bar and the back portion of the front bumper, respectively.

3. The method according to claim 2 wherein the each of the first attachment mechanisms includes a U-shaped clip adapted to fit over a portion of the mounting bar.

4. The method according to claim 3 wherein each of the first attachment mechanisms further includes a fastener, the fastener adapted for insertion into a hole on the mounting bar.

5. The method according to claim 2, wherein the each of the second attachment mechanisms includes a downwardly extending clip, such that the back portion of the front bumper becomes disposed between the clip and a front wall exterior surface of the container during the step of inserting, and the second attachment mechanisms are not rigidly attached to the back portion of the front bumper.

6. The method according to claim 5 wherein the first plurality of first supports protrude from opposite side exterior surfaces of the container, and wherein each of the first attachment mechanisms includes a U-shaped clip adapted to fit over a portion of the mounting bar.

7. The method according to claim 6 wherein the step of selecting further provides that a vertical distance between each of the first supports and each of the second supports is about 10¼ inches, and the exterior surface of the container with a maximum width dimension of 8 inches.

8. The method according to claim 7 wherein the step of selecting further provides the exterior surface of the container with outer dimensions of about 22 inches length and 10 inches height.

9. The method according to claim 1 wherein the first support includes two arms that each protrude from opposite side exterior surfaces of the container, and the first support extends above a top exterior surface of the container, such that the first attachment mechanism is disposed above the inner cavity of the container.

10. The method according to claim 9 wherein the first attachment mechanism includes a U-shaped clip adapted to fit over a portion of the mounting bar.

11. The method according to claim 9 wherein the first attachment mechanism includes a fastener, the fastener adapted for insertion into a hole on the mounting bar.

12. The method according to claim 9, wherein the second attachment mechanism includes a downwardly extending clip, such that the back portion of the front bumper becomes disposed between the clip and a front wall exterior surface of the container during the step of inserting, and the second attachment mechanism is not rigidly attached to the back portion of the front bumper.

13. The method according to claim 1, wherein the second attachment mechanism includes a downwardly extending clip, such that the back portion of the front bumper becomes disposed between the clip and a front wall exterior surface of the container during the step of inserting, and the second attachment mechanism is not rigidly attached to the back portion of the front bumper.

14. The method according to claim 1 further including a step of placing an object into the inner cavity, and the step of placing places a tool and jumper cables into the inner cavity.

15. The method according to claim 14 wherein the step of selecting provides a container with a top lid adapted to fully enclose the inner cavity and capable of being opened to expose the inner cavity; and wherein the step of placing the object includes the steps of:

opening the top lid of the container;
inserting the object into the inner cavity; and
closing the top lid of the container.

16. The method according to claim 15, further including the step of locking the top lid after the step of closing the door.

17. The method according to claim 16 wherein the step of locking includes the step of randomizing a combination of a combination lock.

18. The method according to claim 16 wherein the step of locking uses a key.

19. The method according to claim 1, wherein the step of inserting further includes the step of opening the hood prior to the first step of attaching.

20. The method according to claim 1, wherein the plurality of different truck types are selected from a group comprising full sized trucks.

21. An apparatus for storing a plurality of articles under a hood of a motorized vehicle, the motorized vehicle having two front wheels, two rear wheels and an engine compartment, the engine compartment including a top hood, a front bumper disposed below the top hood, and a mounting bar disposed between a radiator and the front bumper, the apparatus comprising:

an article storage container including an exterior surface that covers an inner cavity, the inner cavity adapted for storing the article, the article storage container including a top opening that allows for the insertion and removal of the plurality of articles;

a first support protruding from the exterior surface of the article storage container, the first support further including a first attachment mechanism, the first attachment mechanism disposed above the article storage container and adapted to attach to the mounting bar, and a second support protruding from the exterior of the article storage container, the second support including a second attachment mechanism, the second attachment mechanism adapted to attach to a back portion of the front bumper, wherein the first and second supports are adapted to maintain the container in a substantially level orientation, such that a bottom of the inner cavity is substantially parallel to a plane created by the two front and two rear tires.

22. The apparatus according to claim 21 further comprising a first plurality of first supports that each protrude from the exterior surface of the article storage container, the first plurality of first supports each further including a first attachment mechanism, the first attachment mechanism for each of the first plurality of first supports disposed above the article storage container, adapted to attach to the mounting bar, and disposed in a parallel plane with each other; and a second plurality of second supports protruding from the exterior of the article storage container, the second plurality of second supports each further including a second attachment mechanism, the second attachment mechanism for each of the second plurality of second supports disposed in a parallel plane with each other, and adapted to attach to a back portion of the front bumper.

23. The apparatus according to claim 22 wherein the each of the first attachment mechanisms includes a U-shaped clip adapted to fit over a portion of the mounting bar.

24. The apparatus according to claim 23 wherein each of the first attachment mechanisms further includes a fastener, the fastener adapted for insertion into a hole on the mounting bar.

25. The apparatus according to claim 22, wherein the each of the second attachment mechanisms includes a downwardly extending clip, such that the back portion of the front bumper becomes disposed between the clip and a front wall exterior surface of the article storage container.

26. The apparatus according to claim 25 wherein the first plurality of first supports protrude from opposite side exterior surfaces of the article storage container, and wherein each of the first attachment mechanisms includes a U-shaped clip adapted to fit over a portion of the mounting bar.

27. The apparatus according to claim 26 wherein a vertical distance between each of the first supports and each of the second supports is about 10¼ inches, and the exterior surface of the article storage container has a maximum outer width dimension of 8 inches.

28. The apparatus according to claim 27 wherein the exterior surface of the article storage container has outer dimensions of about 22 inches length and 10 inches height.

29. The apparatus according to claim 21 wherein the first support includes two arms that protrude from opposite side exterior surfaces of the article storage container.

30. The apparatus according to claim 29 wherein the first attachment mechanism includes a U-shaped clip adapted to fit over a portion of the mounting bar.

31. The apparatus according to claim 29 wherein the first attachment mechanism includes a fastener, the fastener adapted for insertion into a hole on the mounting bar.

32. The apparatus according to claim 29, wherein the second attachment mechanism includes a downwardly extending clip, such that the back portion of the front bumper becomes disposed between the clip and a front wall exterior surface of the article storage container during the step of inserting, and the second attachment mechanism is not rigidly attached to the back portion of the front bumper.

33. The apparatus according to claim 21, wherein the second attachment mechanism includes a downwardly extending clip, such that the back portion of the front bumper becomes disposed between the clip and a front wall exterior surface of the article storage container during the step of inserting, and the second attachment mechanism is not rigidly attached to the back portion of the front bumper.

34. The apparatus according to claim 21 further including a top lid adapted to fully cover the top opening and enclose the inner cavity and capable of being opened to expose the inner cavity.

35. The apparatus according to claim 21, further including a lock to lock the top lid.

36. The apparatus according to claim 35 wherein the lock is a combination lock.

37. The apparatus according to claim 35 wherein the lock is a key lock.

38. The apparatus according to claim 37 wherein the lock uses a same key as an ignition key for the vehicle.

39. The apparatus according to claim 37 wherein the lock uses a different key than an ignition key for the vehicle.

* * * * *